April 22, 1969     D. GRAFSTEIN     3,440,101

TEMPERATURE RESPONSIVE GALVANIC CELL

Filed Feb. 9, 1966

DANIEL GRAFSTEIN
INVENTOR.

BY George B. Oujevolk

ATTORNEY

United States Patent Office 3,440,101
Patented Apr. 22, 1969

3,440,101
TEMPERATURE RESPONSIVE GALVANIC CELL
Daniel Grafstein, Morristown, N.J., assignor to General Precision Inc., Little Falls, N.J., a corporation of Delaware
Filed Feb. 9, 1966, Ser. No. 526,120
Int. Cl. H01m 43/00, 39/04
U.S. Cl. 136—83     1 Claim

ABSTRACT OF THE DISCLOSURE

The process of making a galvanic cell pellet, comprising the steps of pressing a copper foil to a flat mass of copper mercury iodide; pressing a flat mass of silver mercury iodide on the copper mercury iodide mass opposite the copper foil; pressing a silver foil on the silver mercury iodide mass opposite the copper mercury iodide mass; and, pressing this composite for a time period of the order of 15 minutes at a pressure of the order of 5,000 p.s.i. under vacuum conditions.

---

The present invention relates to solid state batteries and more particularly to a solid state, temperature-responsive galvanic cell.

Generally speaking, there are two types of electrical cells: voltaic cells consisting of two electrodes of different metals in solution whose chemical action results in an electromotive force, and thermoelectric, where the electromotive force results from a difference of temperature between two junctions of dissimilar metals in the same circuit. Voltaic cells are usually stable over a very wide temperature range depending on the composition of the materials used, whereas thermoelectric cells will react sharply to a rise in temperature. In the voltaic cell, one of the materials used is the electrolyte, which even in the dry cells is a compacted material acting in reality like the liquid electrolyte. In the thermoelectric cell, there is no electrolyte as such, but a path for the flow of current between junctions.

The present invention relates to a cell which is neither voltaic nor thermoelectric, but to a cell where two plates of different electrical potential are separated by a solid mass medium. At a certain temperature, and beyond, in one direction the solid mass medium acts as a barrier effectively preventing galvanic action. Once this critical temperature has been exceeded in the other direction, there is then a sharp, steady, constant, galvanic current flow over a very wide temperature range between the positive and negative element. The action of crossing the critical temperature boundary results in a current flow notwithstanding the small differences in potential between electrodes. The action is, therefore, galvanic rather than voltaic and by this is meant that a large drop in potential is not required to force the electrons of current between plates. On the contrary, past the critical temperature there is a free galvanic displacement of electrons.

The invention, as well as other objects and advantages thereof, will become more apparent from the following description when taken in conjunction with the accompanying drawing, in which.

Figure 3:
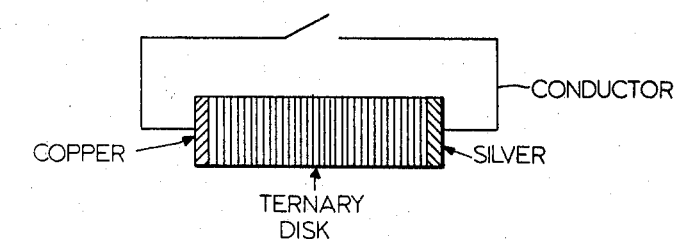
Figure 4:
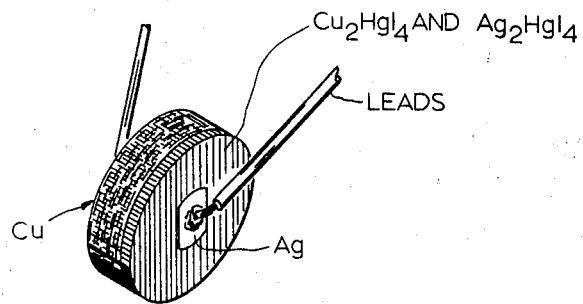

FIG. 3 presents still another schematic explanation of the present invention; and FIG. 4 shows an actual cell in perspective.

The key ingredient in this invention is a solid electrolyte. As is well known, all batteries utilize some sort of mobile phase which permits the migrations of charged particles (ions) toward one or both of the electrodes in order to maintain neutrality and compensate for the transfer of charge (electron current) via the external circuit. Usually, the mobile phase is an aqueous solution of some salt, acid, or base. Sometimes, a viscous gel or paste can be employed in place of a liquid as the electrolyte.

Figure 1:
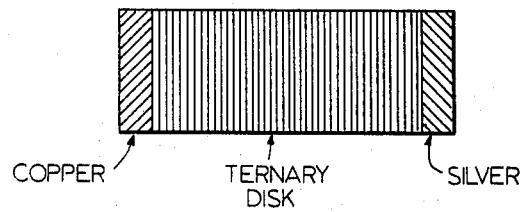
FIG. 1 is a schematic explanation of the cell herein contemplated.
Figure 2:
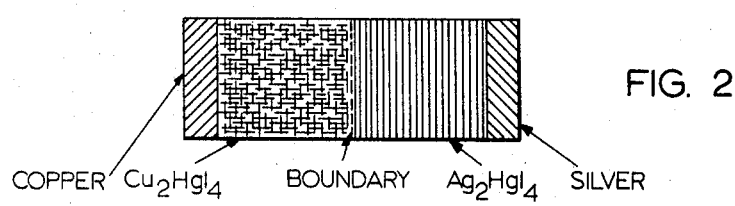
FIG. 2 is likewise a schematic explanation, similar to FIG. 1, but in greater detail.

In the present invention the mobile phase is the high temperature form of certain ternary compounds of mercury, iodine and another metal. The compounds of greatest value are silver mercury iodide, as well as its alloys and composites with copper mercury iodide. Above their respective transition temperatures 50.5° C. for $Ag_2HgI_4$, 69.5° C. for $Cu_2HgI_4$, and 34° C. for $AgCuHgI_4$, i.e., approximately $Ag_{1.2}Cu_{0.8}HgI_4$, the silver and/or copper ions become very mobile due to an order-disorder reaction and these ions become capable of migrating easily under a potential field. Utilizing this mobility of the cations to complete the electrical circuits, a cell can be made to deliver electrical power. A very simple cell design employs copper as one electrode. This electrode is placed in contact with one surface of a pressed disk of a ternary compound or combination of ternary compounds. The other electrode is silver and it is placed in contact with the opposite surface of the ternary compound disk, as shown in FIG. 1. Or, the ternary pressed disk can be a composite and the configuration looks like FIG. 2.

Copper is more electropositive than silver. This means that copper metal will tend to reduce silver salts to the free element. The standard oxidation potentials to the monovalent ions are:

$$Cu \to Cu^{+1} + e - 0.521$$
$$Ag \to Ag^{+1} + e - 0.7991$$

and we can write the electrode reactions as follows:

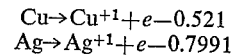

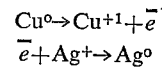

The EMF of such a cell is calculated to be $$E° = E°_{Cu,Cu+} + E°_{Ag+,Ag} = -0.521 + (+.7991) = +.278$$

and the free energy change is given by:

$$\Delta F° = -nFE° = -96,500 \times 0.278 = -26,827$$

joules $= -6,400$ cal where F is the Faraday and $n$ is the number of electrons involved in the reduction reaction.

The cell is completed by the attachment of an external wire of a suitable electrical conductor (silver, copper, platinum, etc.) to each electrode. Thus, the finished cell appears as shown in FIG. 3.

Current begins to flow when the external circuit is completed and the ternary disk is heated above its transition temperature. At that point, copper metal is oxidized at the copper electrode; the copper migrates into the ternary phase as a $Cu^+$ ion leaving an electron at the electrode. The electrons traverse the external wire circuit and proceed to reduce silver ion at the silver electrode. In the disk, both silver and copper ions migrate toward the silver electrode while the matrix of mercury and iodine atoms remains essentially stationary.

Although the potential available from such a cell is very small, a battery may be constructed by employing a series of such cells. This type of cell has the distinct advantage of being mechanically rugged, long lived, and truly solid state. Furthermore, more highly electropositive elements may be used in place of copper as the negative electrode (and either Cu or Ag as the other electrode) and thereby obtain higher potentials.

For the purpose of giving those skilled in the art a better understanding of the invention, the following illustrative example is given:

Cell construction

A 10 mm. diameter circular piece of 2 mil thick (.002 in.) copper foil which had been cleaned of oxides and grease in a pickling bath was placed in a conventional 13 mm. diameter cylindrical die normally used for the preparation of infrared pellets with potassium bromide. About one and a half grams of copper mercury iodide ($Cu_2HgI_4$) was pressed and tamped down on the copper foil to a flat cylinder shape. Then, about one gram of silver mercury iodide ($Ag_2HgI_4$) was pressed and tamped down onto the $Cu_2HgI_4$ cylinder. Finally, a 10 mm. diameter piece of 0.2 mil thick (0.0002 in.) clean silver foil was placed on top of the $Ag_2HgI_4$ cylinder. The composite was pressed for fifteen minutes at 5,000 p.s.i. while the die was evacuated with a forepump. The resulting pellet showed good mechanical stability with satisfactory adherence of the metal electrodes to the ternary compounds. The boundary between the two ternary compounds was clearly discernible. Copper leads were clamped in place to both the copper and silver electrodes and the leads were cemented to the electrodes by the use of a conducting epoxy cement containing 80 parts by weight of silver metal.

The cell was placed in a glass beaker and the beaker in turn was placed inside a small oven. A mercury thermometer was clamped right along side the cell inside the beaker and could be read without opening the oven. The copper wire leads were connected to current or EMF measuring instruments located outside the oven. The EMF data was obtained by connecting the cell to a Millivac Instrument Corp. D.C. Voltmeter type MV 17C, Ser. No. 4579. Current was measured in a second experiment by connecting the cell to a Sensitive Research Co. D.C. Microammeter. The oven was set at an initial high temperature and then measurements were made as the cell was allowed to cool slowly.

TABLE OF TEST RESULTS

| Temp., °C. | EMF, millivolts | Temp., °C. | EMF, millivolts | Temp., °C. | EMF, millivolts |
|---|---|---|---|---|---|
| 106 | 125 | 72 | 112 | 57 | 14 |
| 100 | 120 | 70 | 112 | 54 | 8 |
| 96 | 125 | 67 | 109 | 53 | 6.5 |
| 92 | 120 | 65.5 | 94 | 52 | 5.2 |
| 88 | 122 | 64 | 82 | 51 | 4.3 |
| 86 | 122 | 62 | 60 | 50 | 3.6 |
| 83.5 | 120 | 61 | 45 | 49 | 3.2 |
| 79 | 118 | 60 | 32 | 48 | 2.9 |
| 78 | 116 | 59 | 24 | 47 | 2.8 |
| 74 | 112 | 58 | 19 | | |

| Temp., °C. | Current, microamps | Temp., °C. | Current, microamps | Temp., °C. | Current, microamps |
|---|---|---|---|---|---|
| 116 | 3.5 | 106 | 2.2 | 92 | 1.00 |
| 114 | 3.1 | 102 | 2.0 | 78 | 0.40 |
| 111 | 2.7 | 100 | 1.65 | 65.5 | 0.11 |
| 109 | 2.4 | 96 | 1.35 | | |

It is to be observed, therefore, that the present invention provides for a galvanic cell having positive and negative plates, e.g., copper and silver on opposite sides of a mass of a metal mercury iodide such as silver mercury iodide or a composite or solid solution of silver mercury iodide and copper mercury iodide. This cell, in the form of a pellet, is made by pressing a copper foil to a flat mass of copper mercury iodide, pressing a flat mass of silver mercury iodide on the copper mercury iodide opposite the copper foil, pressing a silver foil on the silver mercury iodide mass opposite the copper mercury iodide mass and pressing this composite for a time period of the order of 15 minutes at a pressure of the order of 5,000 p.s.i. under vacuum conditions.

While the present invention has been described in a preferred embodiment, it will be obvious to those skilled in the art that various modifications can be made therein within the scope of the invention, and it is intended that the appended claim cover all such modifications.

What is claimed is:

1. The process of making a galvanic cell pellet, comprising the steps of pressing a copper foil to a flat mass of copper mercury iodide; pressing a flat mass of silver mercury iodide on the copper mercury iodide mass opposite the copper foil; pressing a silver foil on the silver mercury iodide mass opposite the copper mercury iodide mass; and, pressing this composite for a time period of the order of 15 minutes at a pressure of the order of 5,000 p.s.i. under vacuum conditions.

References Cited

UNITED STATES PATENTS

| | | | |
|---|---|---|---|
| 2,696,513 | 12/1954 | Lehovec | 136—83 |
| 2,718,539 | 9/1955 | Bradshaw et al. | 136—83 |
| 3,170,817 | 2/1965 | Mrgudich | 136—83 |
| 3,186,875 | 6/1965 | Freeman | 136—83 |

WINSTON A. DOUGLAS, *Primary Examiner.*

C. F. LE FEVOUR, *Assistant Examiner.*

U.S. Cl. X.R.

136—153, 23